(12) United States Patent
Jiang et al.

(10) Patent No.: US 11,092,228 B2
(45) Date of Patent: Aug. 17, 2021

(54) DRIVING APPARATUS

(71) Applicants: DAIHEN CORPORATION, Osaka (JP); NIKON CORPORATION, Tokyo (JP)

(72) Inventors: Nan Jiang, Osaka (JP); Hiroshi Nakagiri, Osaka (JP); Kota Hoshijima, Osaka (JP); Kenji Omata, Utsunomiya (JP)

(73) Assignee: DAIHEN CORPORATION, Tokyo (JP)

( * ) Notice: Subject to any disclaimer, the term of this patent is extended or adjusted under 35 U.S.C. 154(b) by 229 days.

(21) Appl. No.: 16/110,911

(22) Filed: Aug. 23, 2018

(65) Prior Publication Data

US 2018/0363758 A1   Dec. 20, 2018

Related U.S. Application Data

(63) Continuation of application No. PCT/JP2017/005082, filed on Feb. 13, 2017.

(30) Foreign Application Priority Data

Feb. 25, 2016 (JP) .............................. JP2016-033867

(51) Int. Cl.
*F16H 57/029* (2012.01)
*H02K 11/21* (2016.01)
(Continued)

(52) U.S. Cl.
CPC ............ *F16H 57/029* (2013.01); *B25J 17/00* (2013.01); *B25J 19/00* (2013.01); *F16H 1/28* (2013.01);
(Continued)

(58) Field of Classification Search
CPC ...... F16H 57/029; F16H 1/28; F16H 57/0464; F16H 57/0486; H02K 11/21; H02K 5/10;
(Continued)

(56) References Cited

U.S. PATENT DOCUMENTS 6,729,201 B2   5/2004   Mori et al.
9,793,778 B2 * 10/2017   Omata ..................... H02K 7/14
(Continued)

FOREIGN PATENT DOCUMENTS

JP         2522495 Y2    1/1997
JP       2002-096285 A   4/2002
(Continued)

OTHER PUBLICATIONS

Extended European Search Report in Europe Application No. 17756277.4, dated Aug. 7, 2019, 4 pages.

*Primary Examiner* — Daniel D Yabut
(74) *Attorney, Agent, or Firm* — Crowell & Moring LLP

(57) ABSTRACT

A driving apparatus has a problem in that during the maintenance operation, foreign matter moves from the tip end side of an input shaft into a hollow space. Therefore, a driving apparatus includes an input shaft with a hollow space formed therein, the hollow space penetrating therethrough in the axial direction, a motor that rotates the input shaft, a reduction gear that receives the power of the motor 1 from the input shaft, an output shaft inserted through the hollow space of the input shaft and adapted to rotate about the rotation axis with power output from the reduction gear, and a detector that detects information on the rotation of the input shaft and the output shaft. A limiting member, which limits the movement of foreign matter into the hollow space of the input shaft from one side to the other side of the motor, is arranged in the hollow space between the input shaft and the output shaft.

13 Claims, 11 Drawing Sheets

(51) Int. Cl.
  *F16H 1/28* (2006.01)
  *F16H 57/04* (2010.01)
  *H02K 5/10* (2006.01)
  *H02K 7/00* (2006.01)
  *H02K 7/08* (2006.01)
  *H02K 7/116* (2006.01)
  *H02K 15/00* (2006.01)
  *B25J 19/00* (2006.01)
  *B25J 17/00* (2006.01)

(52) U.S. Cl.
  CPC ..... *F16H 57/0464* (2013.01); *F16H 57/0486* (2013.01); *H02K 5/10* (2013.01); *H02K 7/003* (2013.01); *H02K 7/083* (2013.01); *H02K 7/116* (2013.01); *H02K 11/21* (2016.01); *H02K 15/0006* (2013.01)

(58) Field of Classification Search
  CPC ........ H02K 7/003; H02K 7/083; H02K 7/116; H02K 15/0006; B25J 17/00; B25J 19/00
  See application file for complete search history.

(56) References Cited

U.S. PATENT DOCUMENTS

2010/0050998 A1* 3/2010 Ai .......................... F02B 39/10
    123/565
2016/0072366 A1 3/2016 Omata et al.

FOREIGN PATENT DOCUMENTS

| JP | 3156488 U | 1/2010 |
| JP | 2010-508456 A | 3/2010 |
| WO | WO 2008/024895 A1 | 2/2008 |
| WO | WO 2014/185489 A1 | 11/2014 |

* cited by examiner

DRIVING APPARATUS

RELATED APPLICATIONS

This is a Continuation of PCT International Application PCT/JP2017/005082 filed on Feb. 13, 2017, which in turn claims benefit of Japanese Patent application JP 2016-033867 filed on Feb. 25, 2016, the entire contents of each of which incorporated herein by reference.

BACKGROUND OF THE INVENTION

1. Field of the Invention

The present invention relates to a driving apparatus that is suitably used for industrial robots, for example.

2. Description of the Related Art

Conventionally, driving apparatuses have been used to drive industrial robots. For example, Patent Literature 1 proposes a driving apparatus including an input shaft that rotates with the power of a motor, a reduction gear that receives the power of the motor from the input shaft, and an output shaft that rotates with the power output from the reduction gear. The input shaft of the driving apparatus has a hollow space formed therein that penetrates through the input shaft in the axial direction, and the output shaft is inserted through the hollow space.

CITATION LIST

Patent Literature

Patent Literature 1: JP 2522495 Y2

SUMMARY OF THE INVENTION

When maintenance is carried out on this type of driving apparatus, it is often the case that the input shaft and the output shaft are integrally detached from the apparatus body such as the reduction gear, and thereafter, the input shaft and the output shaft are fitted into the apparatus body again. However, while the input shaft, which has the output shaft inserted through its hollow space, is attached to the apparatus body, there is a possibility that foreign matter may intrude into the hollow space from the tip end side of the input shaft.

According to the first aspect of the present invention, there is provided a driving apparatus including an input shaft with a hollow space formed therein, the hollow space penetrating through the input shaft in the axial direction; a motor configured to rotate the input shaft about the rotation axis along the axial direction; a reduction gear arranged on one side of the motor, the reduction gear being configured to receive the power of the motor from the input shaft; an output shaft inserted through the hollow space of the input shaft, the output shaft being adapted to rotate about the rotation axis with the power output from the reduction gear; and a detector provided on another side of the motor, the detector being configured to detect information on the rotation of the input shaft and information on the rotation of the output shaft, in which a limiting member is arranged on the one side of the motor in the hollow space between the input shaft and the output shaft, the limiting member being adapted to limit intrusion of foreign matter into the hollow space.

According to the second aspect of the present invention, there is provided a driving apparatus including an input shaft with a hollow space; a motor configured to rotate the input shaft; a reduction gear arranged on one side of the motor, the reduction gear being configured to receive the power of the motor from the input shaft; an output shaft inserted through the hollow space of the input shaft, the output shaft being adapted to rotate about the rotation axis of the motor; and a detector provided on another side of the motor, the detector being configured to detect information on the rotation of the input shaft and information on the rotation of the output shaft, in which the output shaft is attachable to and detachable from the coupling while being integrally coupled to the input shaft, and a limiting member is arranged on the one side of the motor in the hollow space between the input shaft and the output shaft, the limiting member being adapted to limit movement of foreign matter into the hollow space.

According to the third aspect of the present invention, there is provided a driving apparatus including an input shaft with a hollow space formed therein; a motor configured to rotate the input shaft; a reduction gear arranged on one side of the input shaft, the reduction gear being configured to receive the power of the motor from the input shaft; an output shaft inserted through the hollow space of the input shaft, the output shaft being adapted to rotate with the power output from the reduction gear; and a limiting member arranged in the hollow space, the limiting member being adapted to limit intrusion of foreign matter into the hollow space.

DETAILED DESCRIPTION OF THE PREFERRED EMBODIMENTS

Hereinafter, several embodiments for carrying out the present invention will be described with reference to FIGS.

1 to 11. It should be noted that the scope of the present invention is not limited to the following embodiments, and can be changed as appropriate within the spirit and scope of the present invention.

First Embodiment

1. Regarding the Structure of a Driving Apparatus 100

Figure 1:
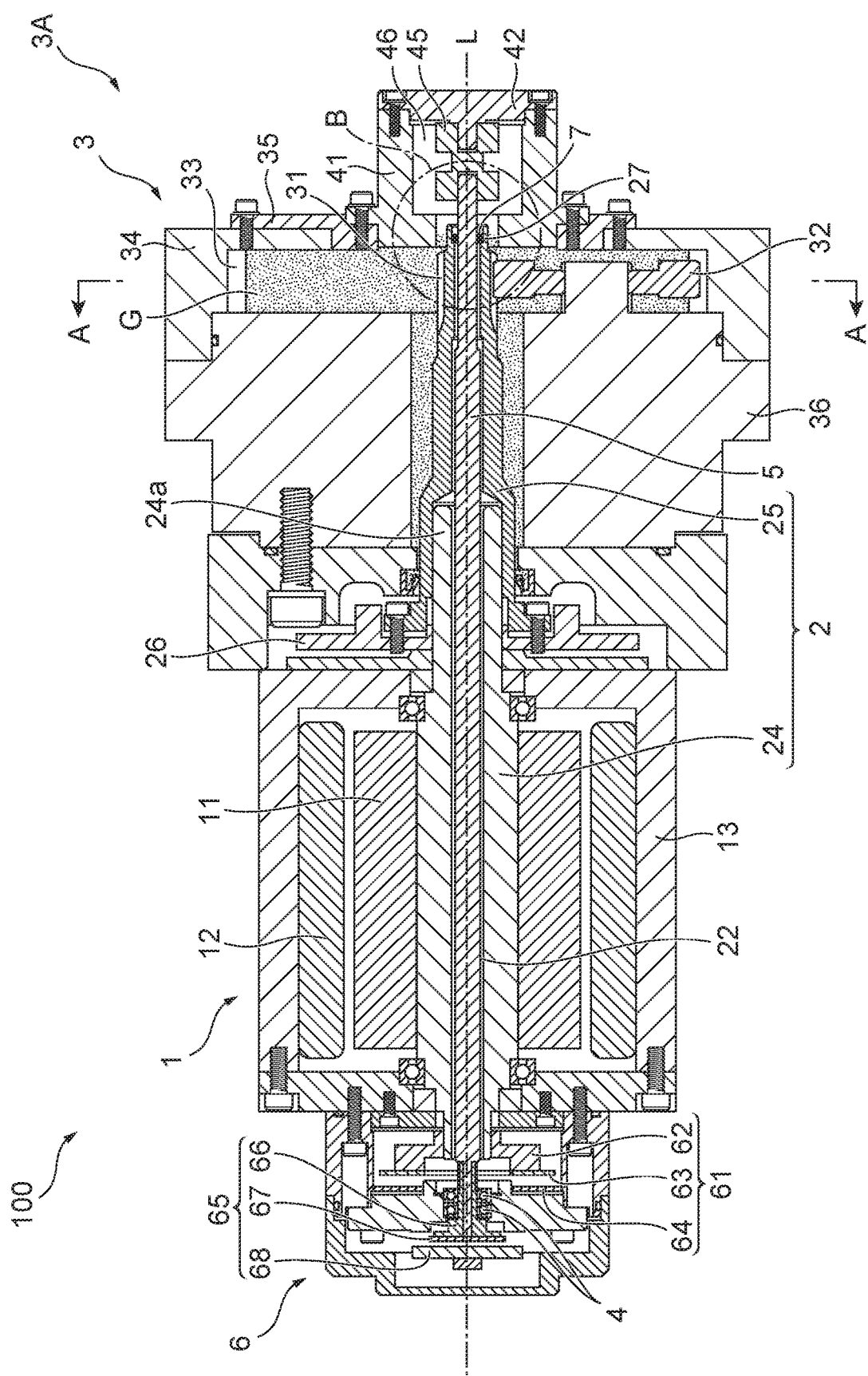
FIG. 1 is a schematic cross-sectional view illustrating the entire configuration of a driving apparatus in accordance with the first embodiment.
Figure 2:
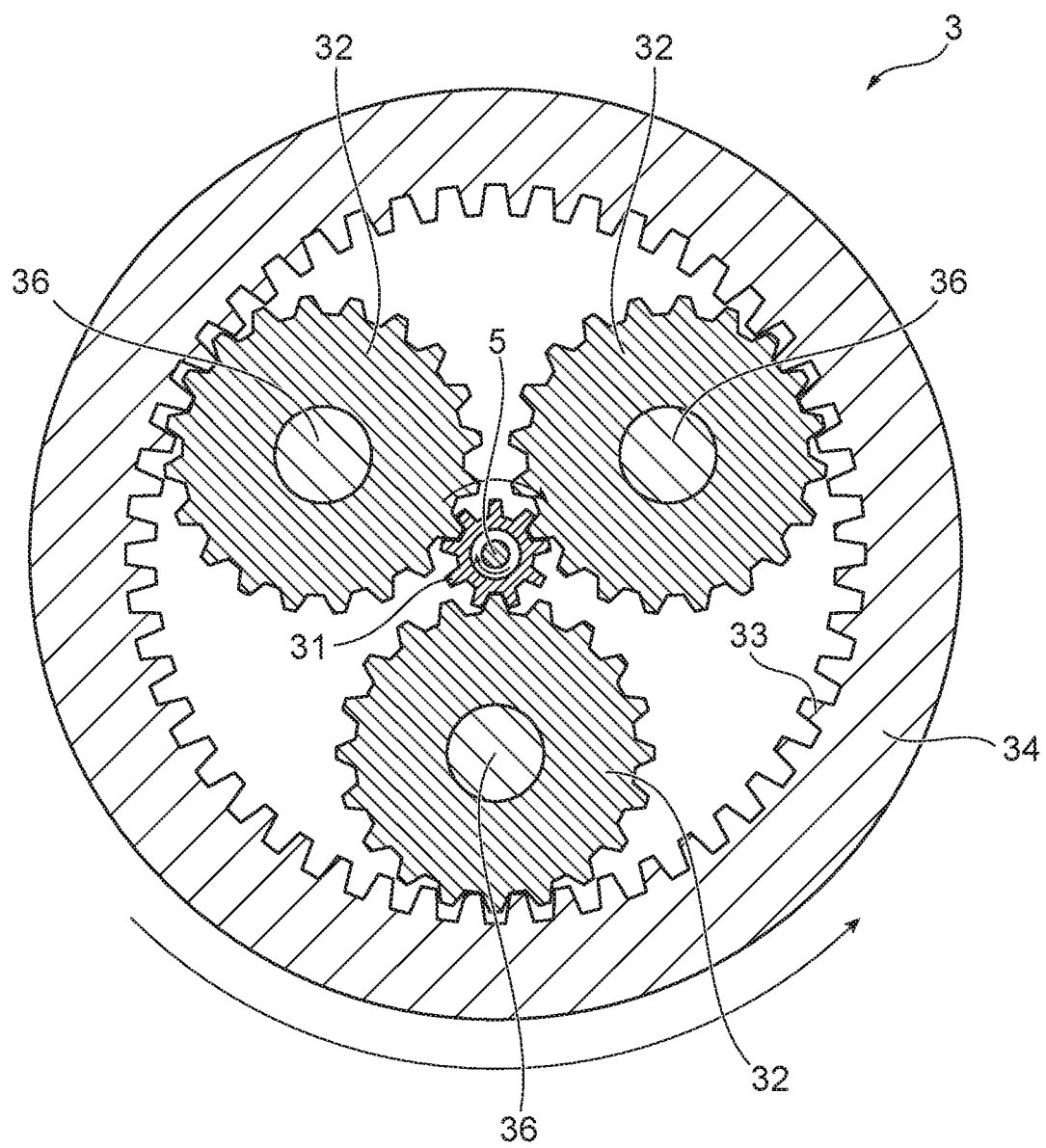
FIG. 2 is a cross-sectional view taken along line A-A of FIG. 1.
Figure 3:
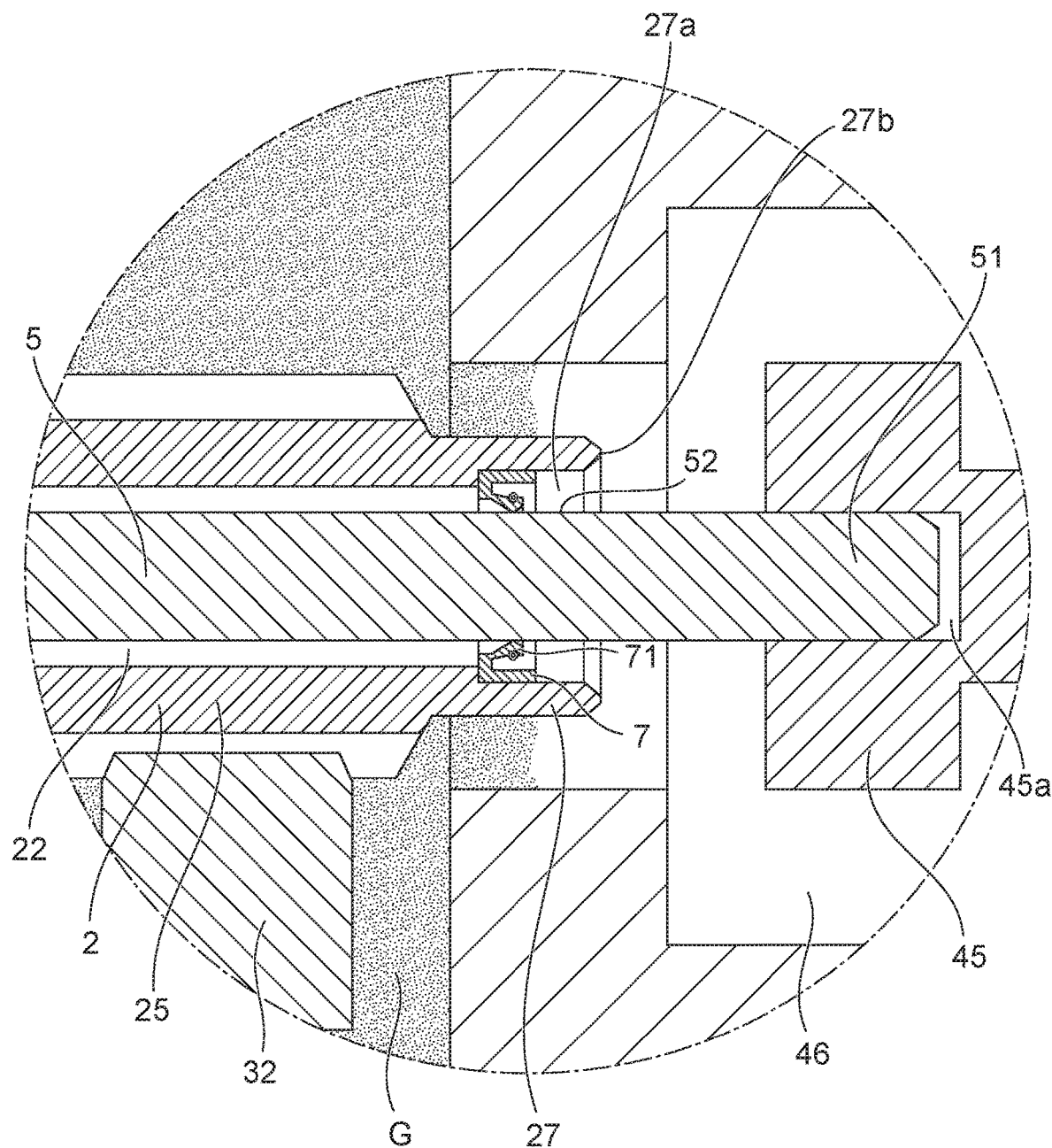
FIG. 3 is an enlarged cross-sectional view of a region around a portion B illustrated in FIG. 1.

FIG. 1 is a schematic cross-sectional view illustrating the entire configuration of a driving apparatus 100 in accordance with the first embodiment. FIG. 2 is a cross-sectional view taken along line A-A of FIG. 1. FIG. 3 is an enlarged cross-sectional view of a region around a portion B illustrated in FIG. 1.

As illustrated in FIG. 1, the driving apparatus 100 in accordance with this embodiment is an apparatus that is used for a robot, for example, and that has a configuration in which power from a motor 1 is input to a transmitter 3A including a reduction gear 3, for example, via an input shaft 2, and an output shaft 5 is rotationally driven via the transmitter 3A. The driving apparatus 100 includes at least the motor 1, the input shaft 2, the transmitter 3A, and the output shaft 5, and further includes a detector 6 as a more preferable configuration.

The motor 1 is a servomotor of a synchronous motor that includes at least a rotor 11 having a permanent magnet arranged thereon, a stator 12 having a coil arranged thereon, and a casing 13 housing them. In this embodiment, although an electric motor is used for the motor 1, an air motor that uses air as power, a hydraulic motor that uses hydraulic pressure as power, or the like can also be used.

The rotor 11 of the motor 1 has a first shaft 24 coupled thereto. A tip end of the first shaft 24, located on one side of the motor 1, has a second shaft 25 integrally attached thereto via an attachment 26. In this embodiment, the first shaft 24 and the second shaft 25 form the input shaft 2 that inputs the power of the motor 1 to the reduction gear 3 of the transmitter 3A.

The input shaft 2 is substantially cylindrical in shape, and rotates about the rotation axis L as the motor 1 is rotationally driven. The input shaft 2 has a hollow space 22 formed therein that penetrates through the input shaft 2 in the axial direction (the direction of the axis), and the output shaft 5 is inserted through the hollow space 22. It should be noted that the axial direction is the direction that serves as the central line of a rotational motion when the input shaft 2 rotates, and that coincides with the rotation axis L. The input shaft 2 through which the output shaft 5 is inserted is arranged such that the input shaft 2 penetrates through the opposite sides of the motor 1.

The transmitter 3A, which transmits the rotation of the input shaft 2 to the output shaft 5, is arranged on one side of the motor 1, that is, one side of the input shaft 2. One side of the motor 1 may be rephrased as the transmitter 3A side of the motor 1. The transmitter 3A may include the reduction gear 3. The reduction gear 3 receives the power of the motor 1 from the input shaft 2. Although a planetary gear mechanism is used for the reduction gear 3 in this embodiment, a harmonic gear mechanism or a mechanical reduction gear may also be used, for example.

As illustrated in FIG. 2, the planetary gear mechanism in accordance with this embodiment includes a sun gear 31 that rotates about the rotation axis L, three planet gears 32 that rotate while meshing with the sun gear 31, and an internal gear 33 that rotates while meshing with the three planet gears 32. The sun gear 31 is formed on the input shaft 2 (specifically, the second shaft 25), and the internal gear 33 is formed on a cover 34 of the reduction gear 3. Each of the three planet gears 32 is coupled to a planet carrier 36 so as to be rotatable.

With the aforementioned configuration, the power of the motor 1 transmitted from the input shaft 2 is transmitted to the reduction gear 3, and with the transmitted power, the cover 34, which has the internal gear 33 formed thereon, rotates about the rotation axis L. Lubricant G, such as grease or oil like oil mist, is housed within the reduction gear 3, and the input shaft 2 is connected to the reduction gear 3 as a tip end 27 of the input shaft 2 is inserted into the reduction gear 3. Although the sun gear 31 is formed on the input shaft 2 in this embodiment, the sun gear 31 and the input shaft 2 may be formed as separate members and coupled together.

The planet carriers 36 and the cover 34 that partially form the reduction gear 3 can be selectively fixed. When the planet carriers 36 and the cover 34 are not fixed, the planet gears 32 and the internal gear 33 can independently revolve about the sun gear 31. Meanwhile, when the planet carriers 36 and the cover 34 are fixed, the planet gears 32 and the internal gear 33 can integrally revolve about the sun gear 31. In this manner, the reduction gear ratio of the reduction gear 3 can be changed.

The cover 34 of the reduction gear 3 is coupled to one side of a coupling 45 via a plate-like first power transmission member 35, a cylindrical second power transmission member 41, and a third power transmission member 42. Accordingly, the rotation of the cover 34 of the reduction gear 3 can be transmitted to the output shaft 5. It should be noted that one of the first, second, and third power transmission members 35, 41, and 42, for example, may partially form a robot body (not illustrated), or one of them may be connected to the robot body. Consequently, the robot can be operated as the cover 34 rotates.

A joint housing chamber 46 for housing the coupling 45 is formed in an internal space that is formed by the second power transmission member 41 and the third power transmission member 42. The coupling 45 arranged in the joint housing chamber 46 couples the third power transmission member 42 to the output shaft 5 on one side of the input shaft 2 that is one side of the motor 1. With such a configuration, the coupling 45 transmits the power output from the reduction gear 3 to the output shaft 5. With the power output from the reduction gear 3, the output shaft 5 can rotate about the rotation axis L. In addition, since a tip end 51 of the output shaft 5 is coupled to the coupling 45, eccentricity of the output shaft 5 with respect to the rotation axis L can be adjusted. Although the transmitter 3A includes the reduction gear 3, the first, second, and third power transmission members 35, 41, 42, and the coupling 45, for example, the configuration of the transmitter 3A is not particularly limited as long as the transmitter 3A includes at least the reduction gear 3 and the coupling 45, and can transmit the rotation of the input shaft 2 to the output shaft 5.

The output shaft 5 is an elongated cylindrical member, and is inserted through the hollow space 22 of the input shaft 2 without contacting the input shaft 2, so as to rotate with the power output from the reduction gear 3. The output shaft 5 is longer than the input shaft 2, and an end of the output shaft 5 protrudes beyond an end of the input shaft 2. The opposite ends of the output shaft 5 may protrude beyond the opposite ends of the input shaft 2. If the output shaft 5 protrudes on one side of the motor 1, the protruding portion (protrusion) that is the tip end 51 of the output shaft 5 protrudes beyond the reduction gear 3 and the hollow space 22 on the reduction gear 3 side, and this portion is coupled to the coupling 45. The tip end 51 on one side of the output shaft 5 may protrude beyond the hollow space 22 and be connected to the coupling 45 as described above. In addition, a portion on the other side of the output shaft 5 may also protrude beyond the hollow space 22 toward the detector 6 side. The output shaft 5 may be supported by a bearing (first bearing) 4, on the protrusion protruding beyond the hollow space 22 toward the detector 6.

More preferably, the detector 6, which detects rotation information (information on the rotation) of the input shaft and the output shaft, is arranged on the other side of the motor 1, that is, the other side of the input shaft 2. The other side of the motor 1 may be rephrased as the detector side of the motor 1. The detector 6 includes a first detector 61 and a second detector 65. The first detector 61 detects information on the rotation (for example, the direction of the rotation, the angular position, and the number of revolutions) of the input shaft 2. The first detector 61 includes a rotating hub 62, a scale 63, and a sensor (rotation detector) 64. The rotating hub 62 is fixed on an end of the input shaft 2, and the disk-like scale 63 is fixed on the rotating hub 62. Accordingly, the input shaft 2, the rotating hub 62, and the scale 63 are integrally rotatable.

The rotation detector 64 is fixed at a position opposite the scale 63. The rotation detector 64 is a photodetector or a magnetic detector, for example. For example, when the rotation detector 64 is a photodetector, the surface of the scale 63 is irradiated with a detection beam, and the detection beam reflected by an index pattern formed on the surface is received by light-receiving elements, such as photodiodes, for example. The rotation detector 64 can detect information on the rotation of the input shaft 2.

The second detector 65 detects information on the rotation (for example, the direction of the rotation, the angular position, and the number of revolutions) of the output shaft 5. The second detector 65 includes a rotating hub 66, a scale 67, and a sensor (rotation detector) 68. The second detector 65 can detect information on the rotation of the output shaft 5 on the basis of the same principle as the first detector 61. It should be noted that the principle of detecting, with the first detector 61, information on the rotation of the input shaft 2 may differ from the principle of detecting, with the second detector 65, information on the rotation of the output shaft 5.

Further, in this embodiment, as illustrated in FIG. 3, a limiting member 7 is arranged on one side of the motor 1 in the hollow space 22 between the input shaft 2 and the output shaft 5. The limiting member 7 suppresses the movement of foreign matter from the coupling 45 side toward the detector 6 side. Foreign matter is discharged from, for example, the reduction gear 3. Examples of the foreign matter include powder and a fluid, such as oil mist or grease. In addition, the foreign matter is a contaminant, for example. The limiting member 7 may be, for example, a blocking member, and examples thereof include an oil seal. If the limiting member 7 is a blocking member, the limiting member 7 is arranged in an orientation such that it limits (prevents) the intrusion (movement) of foreign matter, such as grease as the lubricant G, from the coupling 45 side toward the detector 6 side. It should be noted that the blocking member may be any element as long as it can seal oil, for example, an O-ring or a lip packing.

In this embodiment, the tip end 27 of the input shaft 2 has a housing recess 27a formed therein, and the limiting member 7 is housed in the housing recess 27a. The limiting member 7 has an annular lip 71, and the lip 71 is tightly attached to the outer periphery 52 of the output shaft 5 at a position where the hollow space 22 is separated from its outside by the limiting member 7.

2. Regarding the Operation of the Driving Apparatus 100

Hereinafter, the operation of the driving apparatus 100 in this embodiment will be described.

First, when the motor 1 is driven, the input shaft 2 rotates about the rotation axis L. With the rotation of the input shaft 2, the power of the motor 1 is input to the reduction gear 3 from the input shaft 2. With the power input to the reduction gear 3, the cover 34 of the reduction gear 3 rotates the number of times corresponding to the reduction gear ratio. With the rotation of the cover 34, the output shaft 5, which is coupled to the cover 34 via the first, second, and third power transmission members 35, 41, and 42 and the coupling 45, rotates the same number of times as the cover 34.

In the first detector 61, the rotating hub 62 and the scale 63 rotate with the rotation of the input shaft 2, and the rotation detector 64 detects information on the rotation of the input shaft 2. Meanwhile, in the second detector 65, the rotating hub 66 and the scale 67 rotate with the rotation of the output shaft 5, and the rotation detector 68 detects information on the rotation of the output shaft 5.

Herein, during operation of the driving apparatus 100, it is supposed that foreign matter may flow out of the inside of the reduction gear 3 toward the joint housing chamber 46 side. In addition, during the maintenance operation for the driving apparatus 100 described below, it is also supposed that foreign matter may intrude into the joint housing chamber 46 side.

However, even in such a case, since the limiting member 7 is provided in the hollow space 22 between the input shaft 2 and the output shaft 5 in this embodiment, the intrusion of foreign matter into the hollow space 22 of the input shaft 2 can be limited (prevented). Consequently, a decrease in the rotation accuracy of the input shaft 2 and the output shaft 5 can be avoided.

3. Regarding the Maintenance Operation for the Driving Apparatus 100

Hereinafter, the maintenance operation for the driving apparatus 100 in this embodiment will be described.

Figure 4:
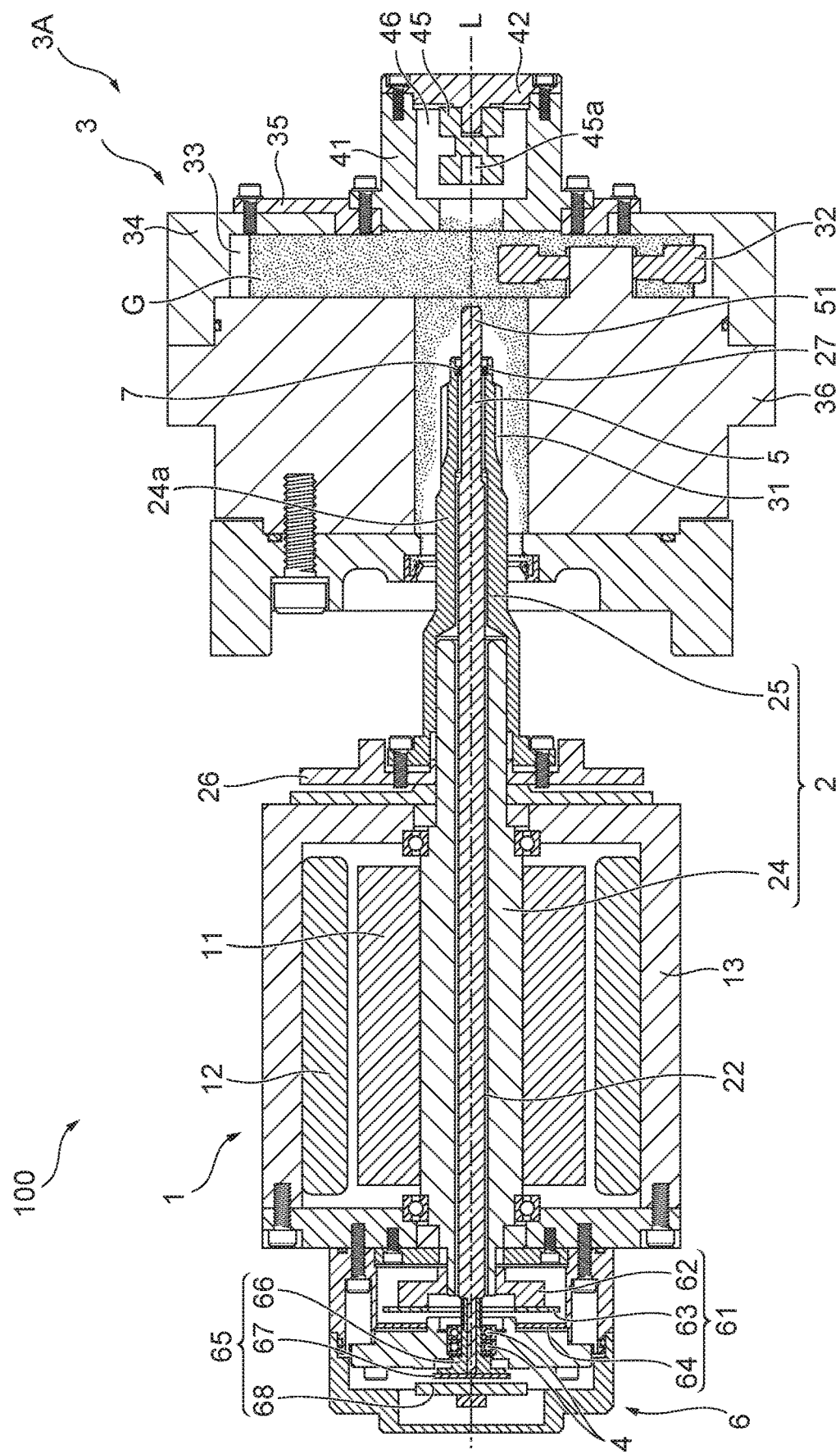
FIG. 4 is a view including the state of the driving apparatus illustrated in FIG. 1 during the maintenance operation.
Figure 5:
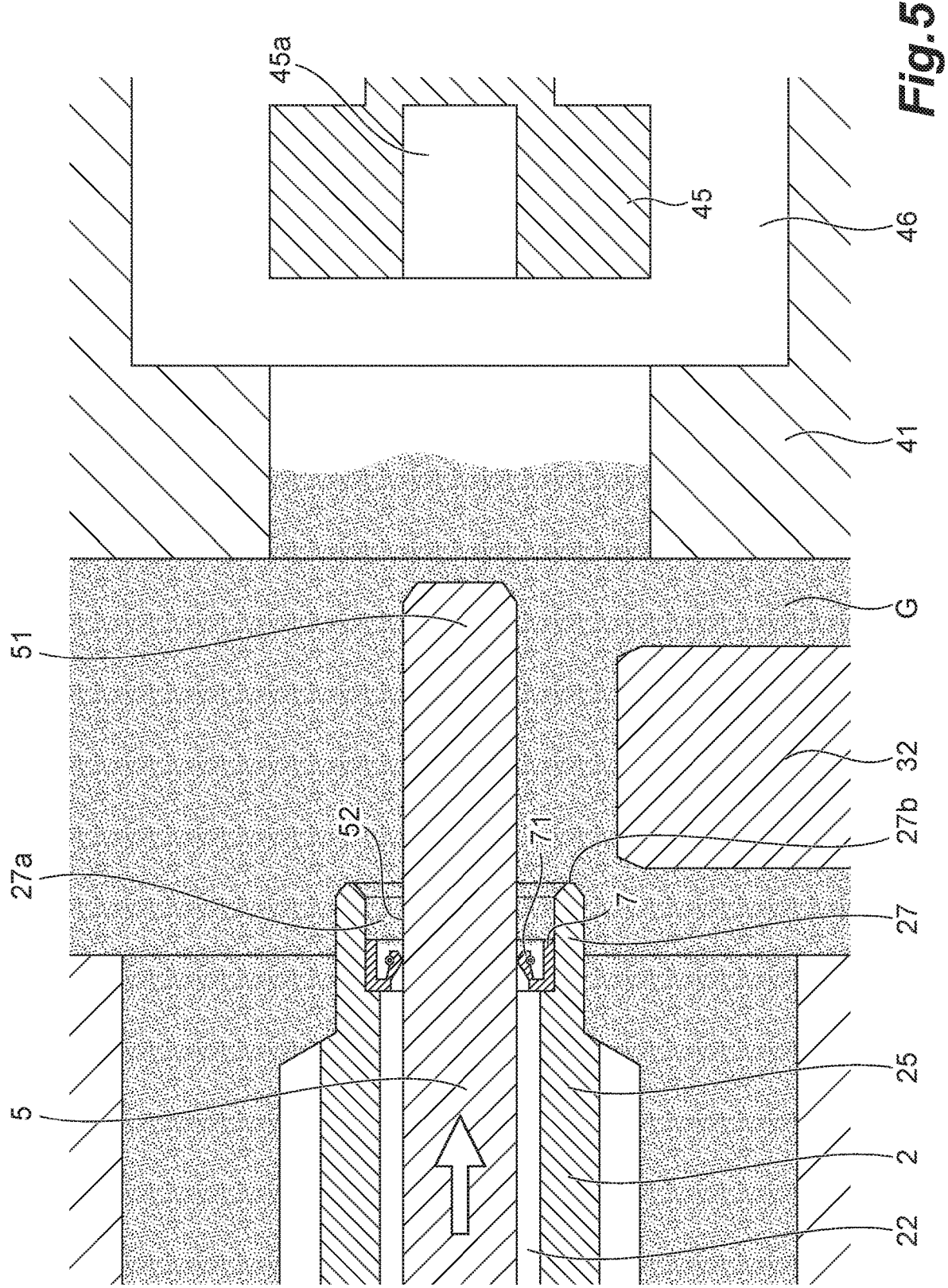
FIG. 5 is an enlarged view of the primary portion illustrating the operation of assembling the driving apparatus from the state illustrated in FIG. 4.

FIG. 4 is a view illustrating the state of the driving apparatus 100 illustrated in FIG. 1 during the maintenance operation. FIG. 5 is an enlarged view of the primary portion illustrating the operation of assembling the driving apparatus 100 from the state illustrated in FIG. 4.

For example, in order to replace the parts of the detector 6 during the maintenance operation, as illustrated in FIG. 4, the parts of the transmitter, such as the reduction gear 3, are left on the robot body side, while the motor 1, the input shaft 2, the output shaft 5, and the detector 6 are integrally pulled out as a single unit. When the input shaft 2 is detached from the reduction gear 3, foreign matter, such as grease, in the reduction gear 3 flows into the space in which the input shaft 2 has been arranged.

After the replacement of the parts, in order to return the unit, which has been pulled out once, to the initial state again, the input shaft 2 is connected again to the reduction gear 3, and the tip end 51 of the output shaft 5, which is inserted through the hollow space 22, is inserted into a coupling hole 45a of the coupling 45. At this time, as illustrated in FIG. 5, the tip end 27 of the input shaft 2 is inserted into the reduction gear 3, so that the tip end 27 passes through the lubricant G, such as grease.

In this embodiment, even in such a case, since the limiting member 7 is arranged in the hollow space 22 between the input shaft 2 and the output shaft 5, it is possible to limit (prevent) the intrusion (movement) of the lubricant G, such as grease, as foreign matter into the hollow space 22. In particular, since foreign matter is likely to intrude from the tip end 27b side of the input shaft 2, arranging the limiting member 7 on or around the tip end 27 can effectively limit the intrusion (movement) of foreign matter into the hollow space 22. Thus, a driving apparatus is provided that can limit the movement of foreign matter into the hollow space of the input shaft, which has the output shaft inserted therethrough, during the maintenance operation for the driving apparatus.

Consequently, when the driving apparatus 100 is driven after the input shaft 2 is attached again to the reduction gear 3, a decrease in the rotation accuracy of the input shaft 2 and the output shaft 5 due to the intrusion of foreign matter into the hollow space 22 can be suppressed. In addition, contamination of the detector 6 due to the intrusion of foreign matter into the hollow space 22 can be suppressed.

Second Embodiment

Figure 6:
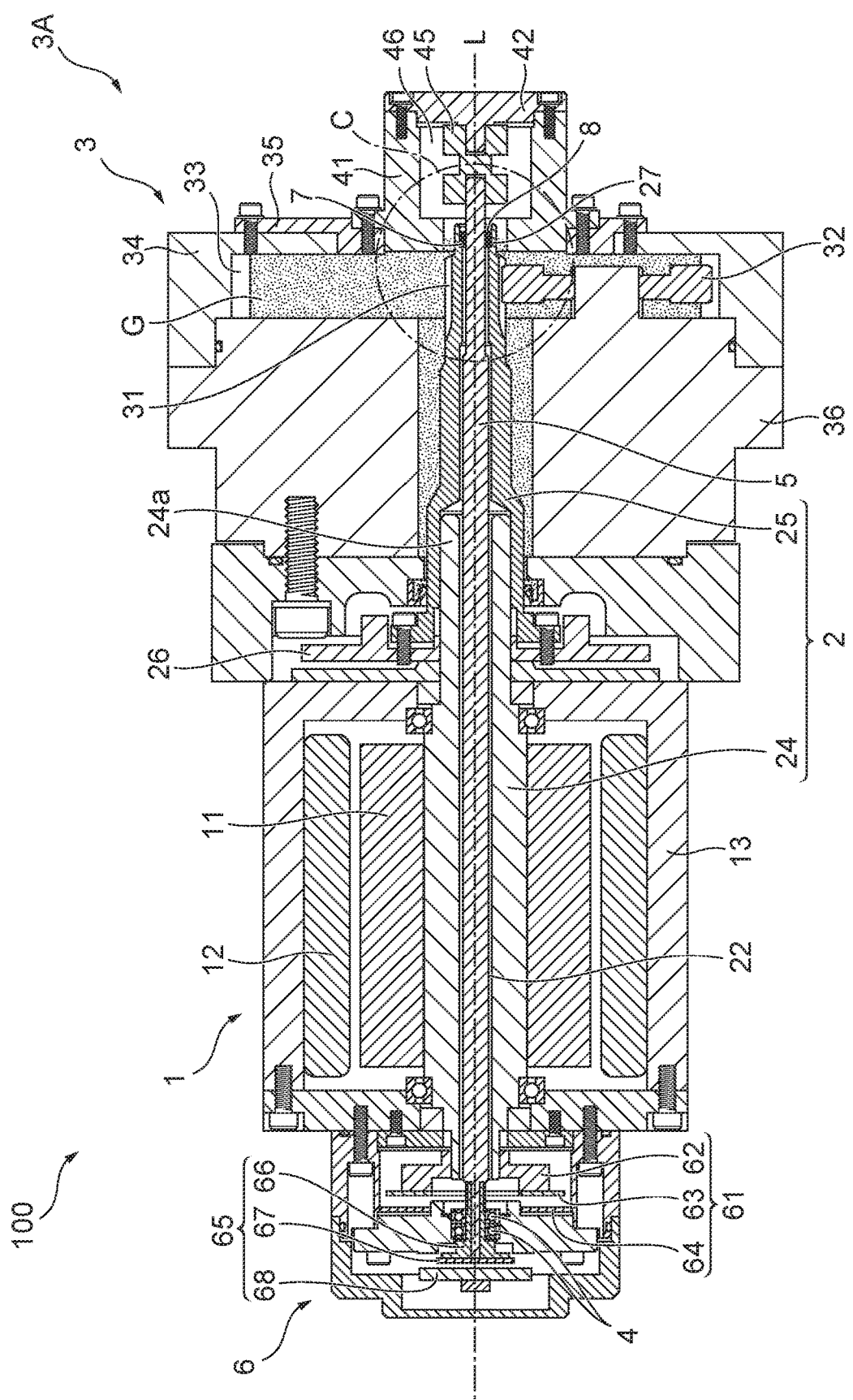
FIG. 6 is a schematic cross-sectional view illustrating the entire configuration of a driving apparatus in accordance with the second embodiment.
Figure 7:
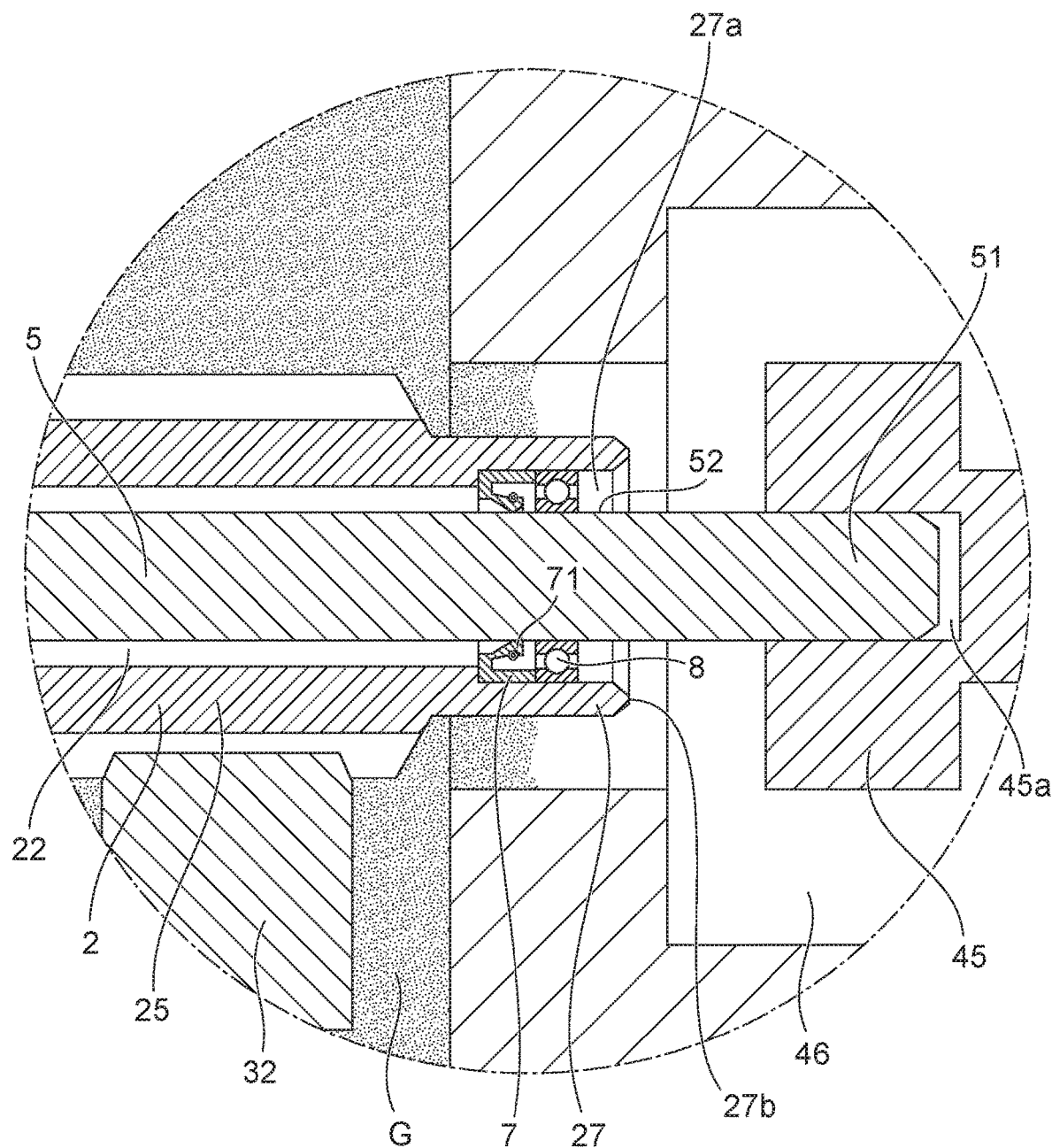
FIG. 7 is an enlarged view of a region around a portion C illustrated in FIG. 6.
Figure 8:
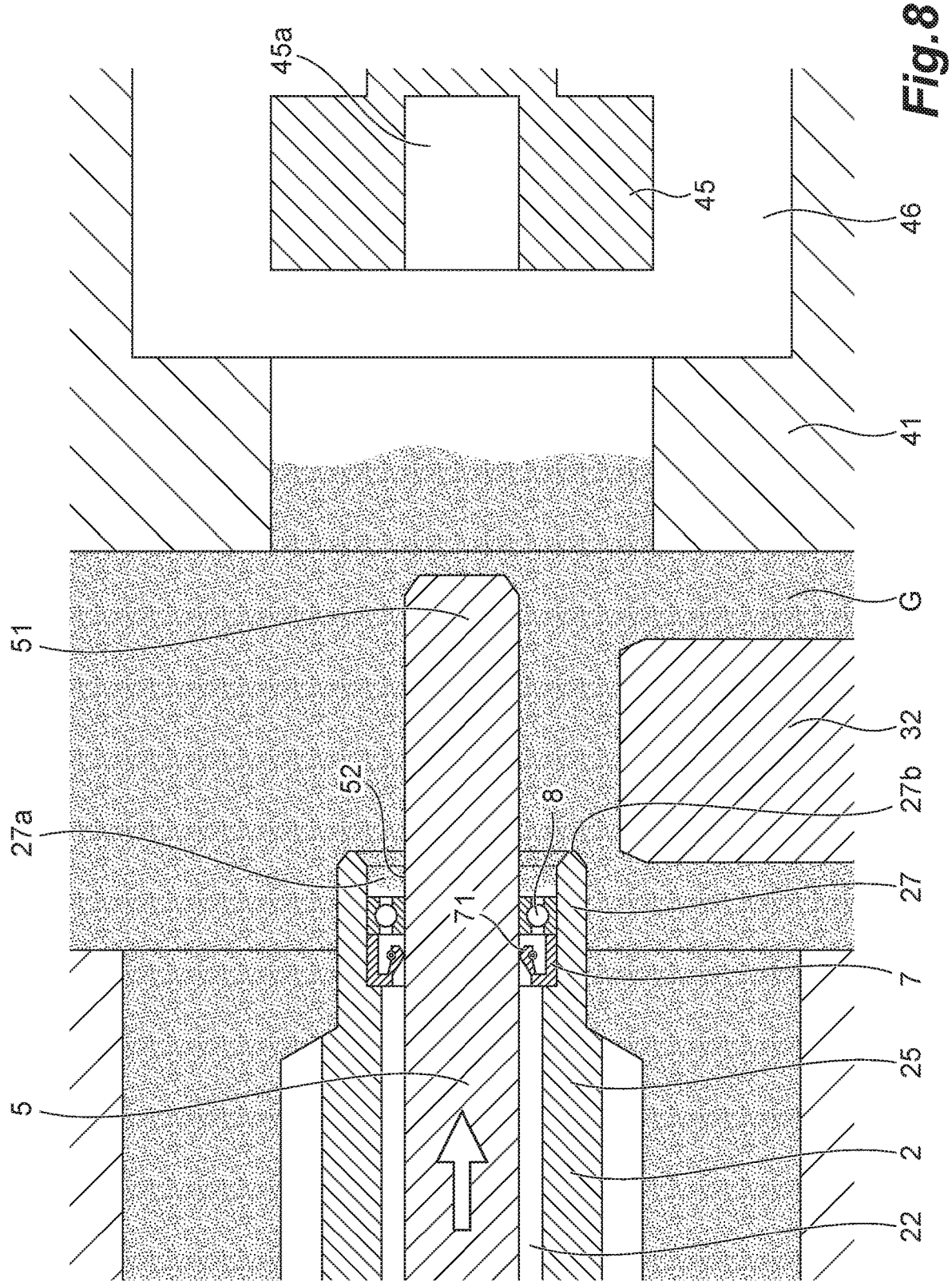
FIG. 8 is an enlarged view of the primary portion illustrating the state of the driving apparatus illustrated in FIG. 6 during the maintenance operation.

FIG. 6 is a schematic cross-sectional view illustrating the entire configuration of a driving apparatus in accordance with the second embodiment. FIG. 7 is an enlarged view of a region around a portion C illustrated in FIG. 6. FIG. 8 is an enlarged view of the primary portion illustrating the state of the driving apparatus illustrated in FIG. 6 during the maintenance operation.

The driving apparatus 100 in the second embodiment differs from that in the first embodiment in that a second bearing 8, which supports the output shaft 5, is further provided. Therefore, in this embodiment, elements that are the same as or equivalent to those in the first embodiment are denoted by the same reference numerals, and the description thereof will be omitted or simplified.

As illustrated in FIG. 6, in the driving apparatus 100 in accordance with the second embodiment, the output shaft 5 is supported on its opposite sides by the first bearing 4 and the second bearing 8. Specifically, as in the first embodiment, the output shaft 5 is supported by the bearing (first bearing) 4 on a side closer to the detector 6 than to the motor 1. Meanwhile, the output shaft 5 is supported by the second bearing 8 on a side closer to the coupling 45 than to the motor 1.

As illustrated in FIG. 7, the second bearing 8 is arranged at a position adjacent to the limiting member 7 in the hollow space 22 between the input shaft 2 and the output shaft 5. More specifically, the second bearing 8 is arranged closer to the tip end 27b side of the input shaft 2 than is the limiting member 7.

As described above, as the output shaft 5 is supported on its opposite sides by the first bearing 4 and the second bearing 8, whirling of the output shaft 5 can be suppressed, and thus the accuracy of detection of information on the rotation of the output shaft 5 by the detector 6 can be enhanced. In particular, since the limiting member 7 is arranged around the second bearing 8, there is no possibility that the limiting member 7 will deform excessively during the operation of or the maintenance operation for the driving apparatus 100, and thus the sealing property of the limiting member 7 can always be ensured easily.

Further, as illustrated in FIG. 8, in order to connect the output shaft 5 together with the input shaft 2 again to the reduction gear 3 during the maintenance operation for the driving apparatus 100, the tip end 27 of the input shaft 2 is inserted into the reduction gear 3, so that the tip end 27 passes through the lubricant G, such as grease, in the reduction gear 3. In this embodiment, since the second bearing 8 is arranged closer to the tip end 27b side of the input shaft 2 than is the limiting member 7, the lubricant G, such as grease, in the reduction gear 3 contacts the second bearing 8. Consequently, even when pressure acts on the tip end 27 of the input shaft 2 due to the lubricant G, such as grease, such pressure does not act directly on the limiting member 7 but acts on the second bearing 8. Consequently, positional deviation of the limiting member 7 can be suppressed, and thus a stable sealing property can be ensured.

Third Embodiment

Figure 9:
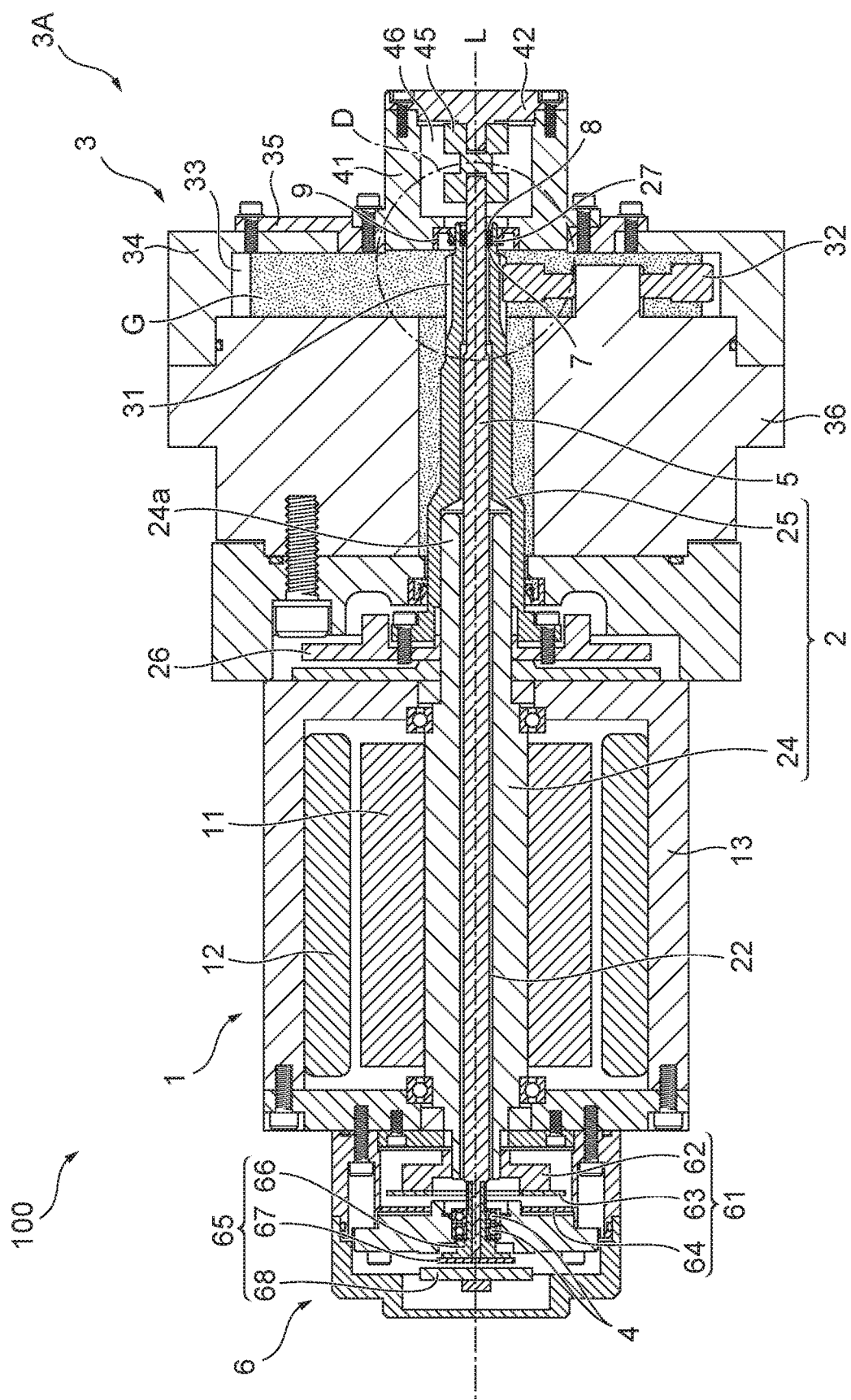
FIG. 9 is a schematic cross-sectional view illustrating the entire configuration of a driving apparatus in accordance with the third embodiment.
Figure 10:
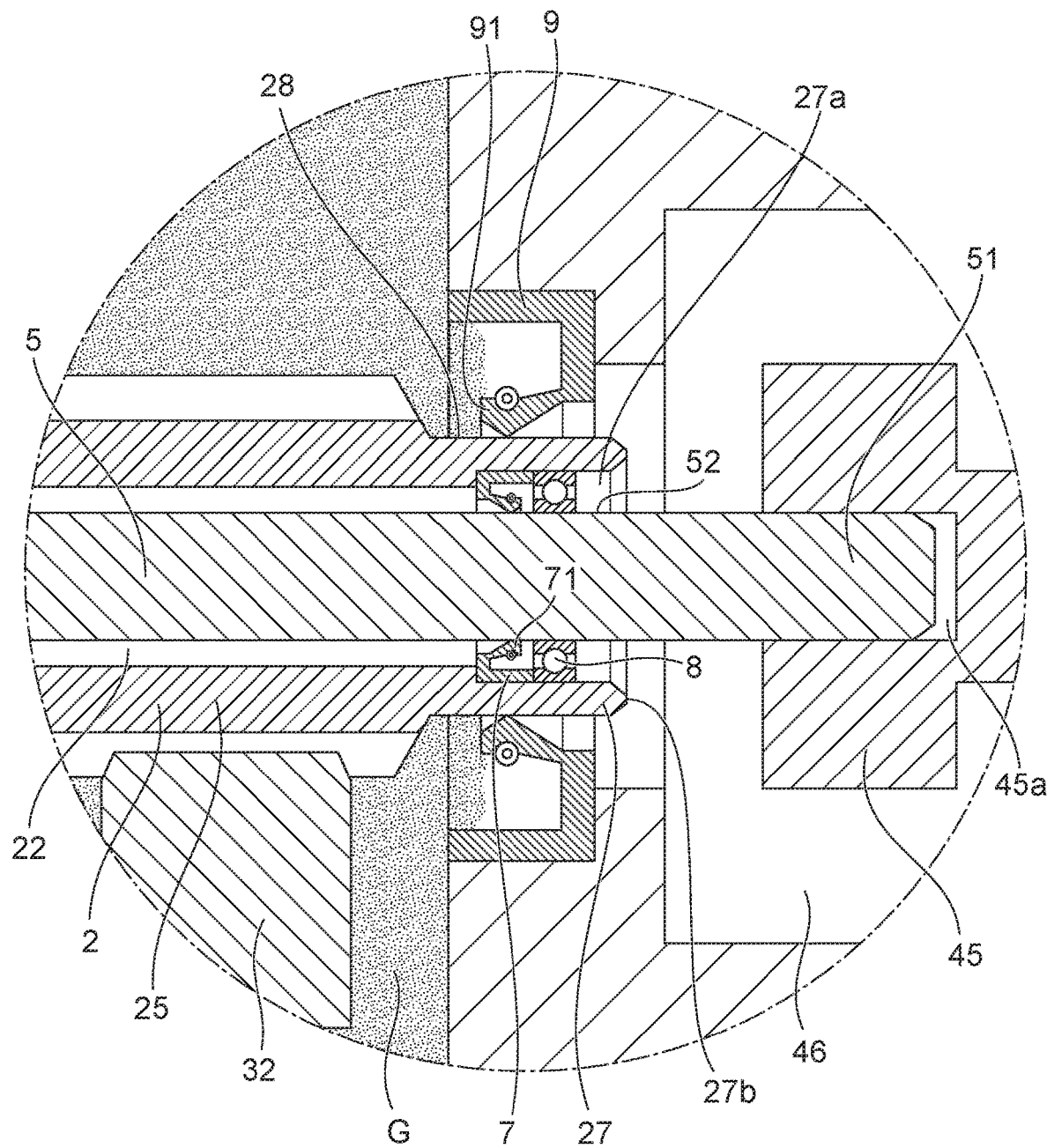
FIG. 10 is an enlarged view of a region around a portion D illustrated in FIG. 9.
Figure 11:
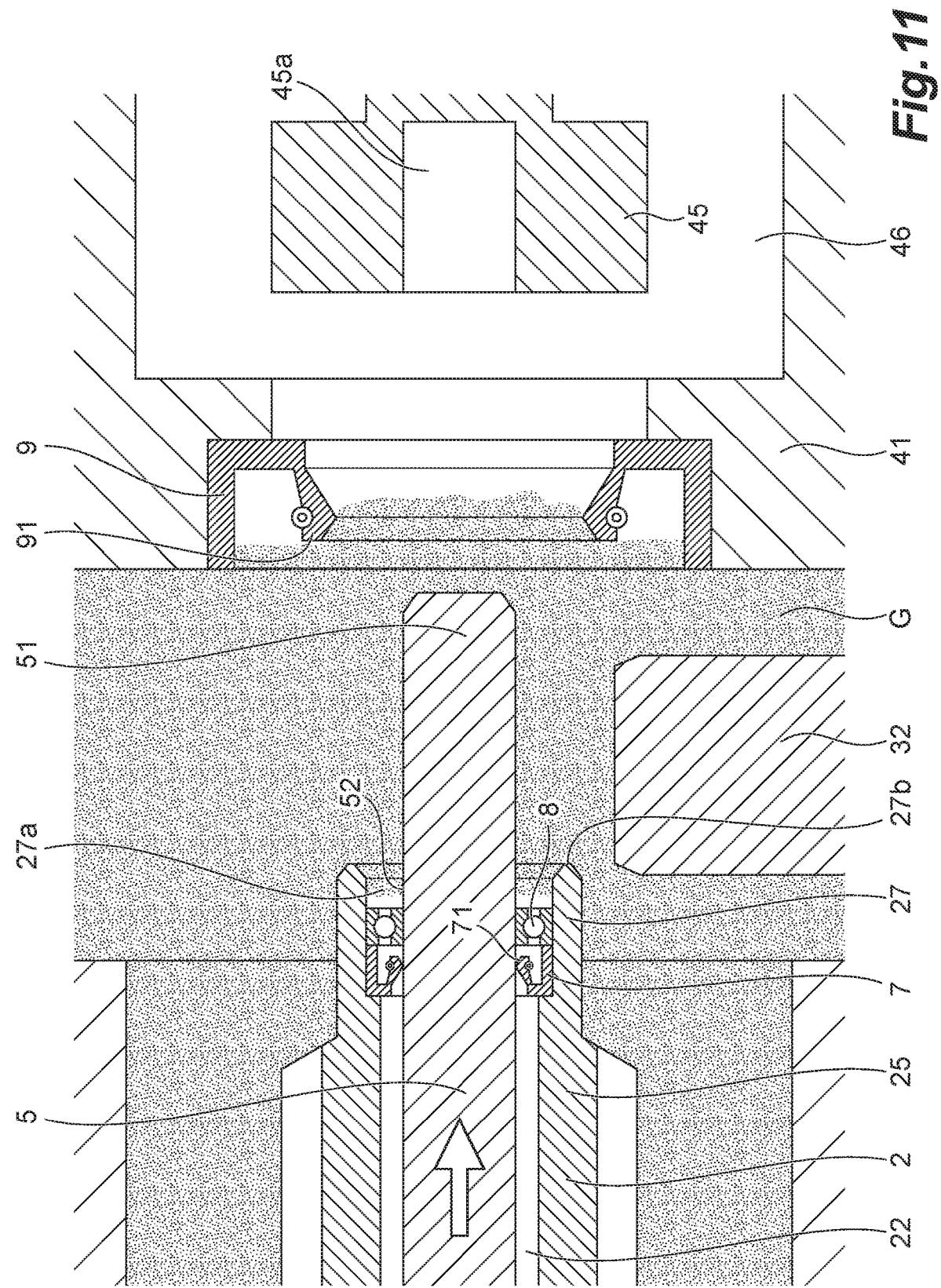
FIG. 11 is an enlarged view of the primary portion illustrating the state of the driving apparatus illustrated in FIG. 9 during the maintenance operation.

FIG. 9 is a schematic cross-sectional view illustrating the entire configuration of the driving apparatus 100 in accordance with the third embodiment. FIG. 10 is an enlarged view of a region around a portion D illustrated in FIG. 9. FIG. 11 is an enlarged view of the primary portion illustrating the state of the driving apparatus 100 illustrated in FIG. 9 during the maintenance operation.

The driving apparatus 100 in the third embodiment differs from that in the second embodiment in that, provided that the limiting member 7 is denoted by a first limiting member, a second limiting member 9 is further provided. Therefore, in this embodiment, elements that are the same as or equivalent to those in the first embodiment are denoted by the same reference numerals, and the description thereof will be omitted or simplified.

As illustrated in FIG. 9, in the driving apparatus 100 in accordance with the third embodiment, the second limiting member 9, which limits the intrusion of foreign matter into the coupling 45 side, is arranged on one side of the motor 1. Specifically, the second limiting member 9 is arranged between the reduction gear 3 and the coupling 45 such that the second limiting member 9 limits (prevents) the intrusion of the lubricant G as foreign matter in the reduction gear 3 into the joint housing chamber 46 of the coupling 45.

The second limiting member 9 may be a blocking member, for example. Examples of the blocking member include an oil seal. If the second limiting member 9 is a blocking member, the second limiting member 9 is arranged in an orientation such that it limits (prevents) the intrusion (movement) of foreign matter, such as grease, as the lubricant G from the reduction gear 3 side toward the coupling 45 side. It should be noted that the blocking member may be any element as long as it can seal oil, for example, an O-ring or a lip packing.

As illustrated in FIG. 10, the second limiting member 9 includes an annular lip 91. The lip 91 is tightly attached to the outer periphery 28 of the input shaft 2 at a position where the inside of the reduction gear 3 is separated from the coupling 45 by the second limiting member 9.

When the second limiting member 9 is further provided, it is possible to limit the flow of the lubricant G, such as grease, out of the inside of the reduction gear 3 during operation of the driving apparatus 100. Therefore, the foreign matter is difficult to reach the limiting member 7.

Further, as illustrated in FIG. 11, during the maintenance operation for the driving apparatus 100, in order to connect the output shaft 5 together with the input shaft 2 again to the reduction gear 3, the tip end 51 of the output shaft 5 passes through the inside of the reduction gear 3 so as to be inserted into the coupling hole 45a of the coupling 45.

Even in such a case, if the second limiting member 9 is fixed on the reduction gear 3 side (specifically, on the second power transmission member 41) as illustrated in FIG. 10, the amount of intrusion of the lubricant G, such as grease, which intrudes into the joint housing chamber 46 from the inside of the reduction gear 3 toward the coupling 45 can be limited by the second limiting member 9.

Although the embodiments of the present invention have been described in detail above, the specific configuration of the present invention is not limited thereto, and any design changes that are within the spirit and scope of the present invention are all included in the present invention.

In the first to third embodiments, a limiting member(s) is/are provided in the hollow space between the input shaft and the output shaft so that the intrusion of grease as foreign matter into the hollow space is limited more effectively. However, instead of the limiting member(s), a mechanical seal, a labyrinth seal, or the like can be used as long as it can limit the intrusion of grease.

What is claimed is:

1. A driving apparatus comprising:
   an input shaft with a hollow space formed therein, the hollow space penetrating through the input shaft m an axial direction of the input shaft;
   a motor configured to rotate the input shaft about a rotation axis running along the axial direction;
   a reduction gear arranged on one side of the motor along the axial direction, the reduction gear being configured to receive power of the motor from the input shaft;
   an output shaft inserted through the hollow space of the input shaft, the output shaft being operably connected to the reduction gear to rotate about the rotation axis with power output from the reduction gear, wherein the output shaft has a protrusion on its reduction gear side, the protrusion protruding beyond the reduction gear and the hollow space; and
   a detector provided on the other side of the motor along the axial direction, the detector being configured to detect information on rotation of the input shaft and information on rotation of the output shaft,
   wherein the driving apparatus further comprises a limiting member arranged on the one side of the motor in the hollow space between the input shaft and the output shaft, the limiting member being adapted to limit intrusion of foreign matter into the hollow space.

2. The driving apparatus according to claim 1, wherein the limiting member is arranged on or around a tip end of the input shaft.

3. The driving apparatus according to claim 1, wherein:
   an inside of the reduction gear is filled with grease, and the input shaft is connected to the reduction gear as a tip end of the input shaft is inserted into the reduction gear, and
   the limiting member includes an oil seal, the oil seal being adapted to limit intrusion of the grease into the hollow space.

4. The driving apparatus according to claim 3, wherein:
   a first bearing is arranged on the other side of the motor, the first bearing being adapted to support the output shaft, and
   a second bearing is arranged on the one side of the motor, at a position adjacent to the oil seal in the hollow space between the input shaft and the output shaft, the second bearing being adapted to support the output shaft.

5. The driving apparatus according to claim 4, wherein the second bearing is arranged closer to the tip end side of the input shaft than is the oil seal.

6. The driving apparatus according to claim 3, wherein:
   a tip end of the output shaft is connected to the reduction gear via a coupling, on the one side of the motor, and a second oil seal is arranged between the reduction gear and the coupling, the second oil seal being adapted to limit intrusion of the grease in the reduction gear into the coupling side.

7. A driving apparatus comprising:
   an input shaft with a hollow space;
   a motor configured to rotate the input shaft;
   a reduction gear arranged on one side of the motor, the reduction gear being configured to receive power of the motor from the input shaft;
   an output shaft inserted through the hollow space of the input shaft, the output shaft being adapted to rotate about a rotation axis of the motor, wherein the output shaft has a protrusion on its reduction gear side, the protrusion protruding beyond the reduction gear and the hollow space; and
   a detector provided on another side of the motor, the detector being configured to detect information on rotation of the input shaft and information on rotation of the output shaft, wherein:
   the output shaft is attachable to and detachable from a coupling while being integrally coupled to the input shaft, and
   a limiting member is arranged on the one side of the motor in the hollow space between the input shaft and the output shaft, the limiting member being adapted to limit movement of foreign matter into the hollow space.

8. The driving apparatus according to claim 7, wherein:
   a tip end of the output shaft on the one side of the motor protrudes beyond the hollow space of the input shaft, and
   the tip end is coupled to the coupling.

9. A driving apparatus comprising:
   an input shaft with a hollow space formed therein;
   a motor configured to rotate the input shaft;
   a reduction gear arranged on one side of the input shaft, the reduction gear being configured to receive power of the motor from the input shaft;
   an output shaft inserted through the hollow space of the input shaft, the output shaft being adapted to rotate with power output from the reduction gear, wherein the output shaft has a protrusion on its reduction gear side, the protrusion protruding beyond the reduction gear and the hollow space; and
   a limiting member arranged in the hollow space, the limiting member being adapted to limit intrusion of foreign matter into the hollow space.

10. The driving apparatus according to claim 9, wherein the limiting member includes an oil seal.

11. The driving apparatus according to claim 9, further comprising a detector arranged on another side of the input shaft, the detector being configured to detect information on rotation of the input shaft and information on rotation of the output shaft.

12. The driving apparatus according to claim 9, wherein a second limiting member is arranged between the reduction gear and a coupling, the second limiting member being adapted to limit intrusion of the foreign matter into the coupling side.

13. The driving apparatus according to claim 9, wherein:
   the output shaft is attachable to a coupling that connects the output shaft to the reduction gear, and
   the limiting member rotatably supports the output shaft integrally with the input shaft in a state where the output shaft is separated from the coupling.

* * * * *

UNITED STATES PATENT AND TRADEMARK OFFICE
CERTIFICATE OF CORRECTION

PATENT NO. : 11,092,228 B2
APPLICATION NO. : 16/110911
DATED : August 17, 2021
INVENTOR(S) : Jiang et al.

Page 1 of 1

It is certified that error appears in the above-identified patent and that said Letters Patent is hereby corrected as shown below:

On the Title Page

Item (73) Assignee: Please delete:
"DAIHEN CORPORATION, Tokyo (JP)"
And replace with:
-- DAIHEN CORPORATION, Osaka, (JP)
NIKON CORPORATION, Tokyo (JP) --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*